May 15, 1934.  W. R. NUSBAUM  1,958,674
DEVICE FOR FACILITATING THE SECURING OF BOLTS IN WALLS
Filed May 19, 1932
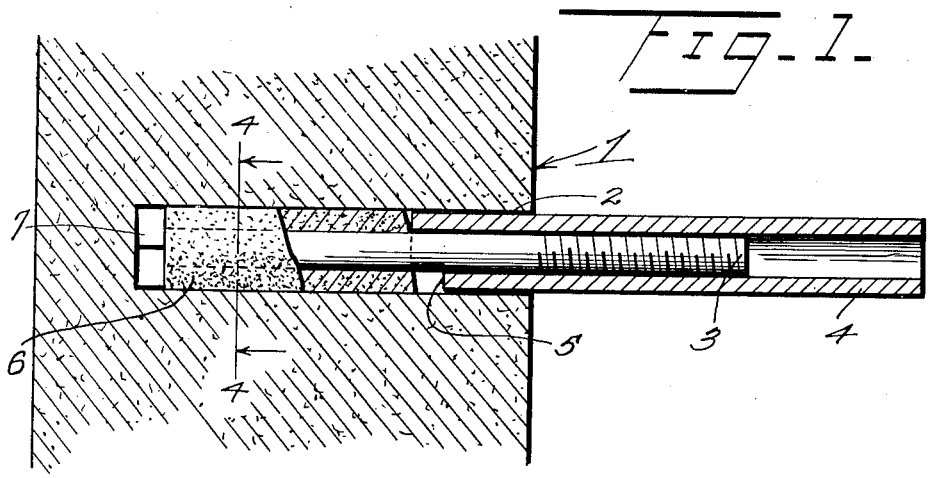
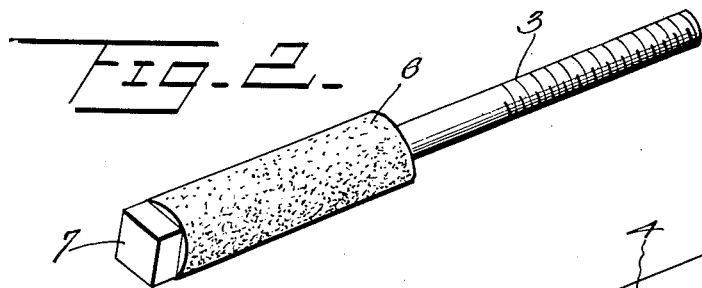
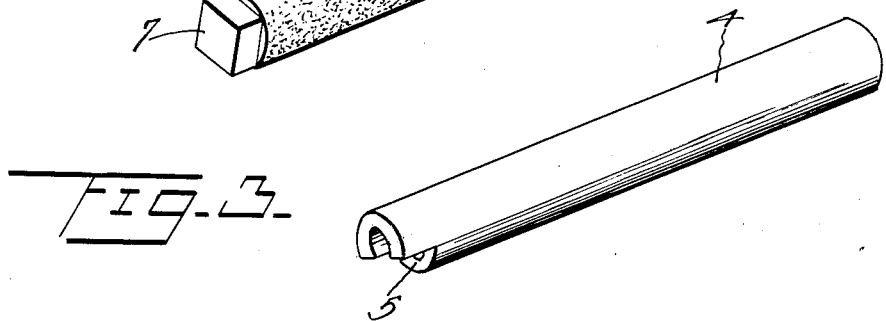
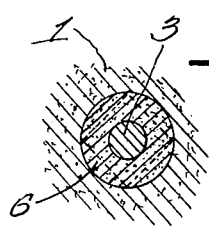
Inventor
W. R. Nusbaum
By Watson E. Coleman
Attorney Patented May 15, 1934

1,958,674

UNITED STATES PATENT OFFICE 1,958,674

DEVICE FOR FACILITATING THE SECURING OF BOLTS IN WALLS

William R. Nusbaum, Tiffin, Ohio

Application May 19, 1932, Serial No. 612,369

3 Claims. (Cl. 72—105)

This invention relates to improvements in devices for facilitating the mounting of bolts or similar bodies in walls.

The primary object of the present invention is to provide an improved device for facilitating the securing of the headed end of a bolt in a brick, stone, cement or wood wall, by the use of a plastic substance such as cement or the like.

Another object of the invention is to provide a device for packing or placing a cementing substance in a wall aperture around a bolt and against the inserted head thereof, so as to effect the firm binding of the bolt body in position.

A still further object of the invention is to provide a novel device for tamping the cementing substance in place and for evenly distributing the same about the body or shank of the inserted bolt.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a sectional view of a portion of a wall showing the manner of mounting a bolt therein according to the present method, the tamping element being in longitudinal section;

Figure 2 is a perspective view of a bolt showing the manner of mounting a body of cementing substance thereon preliminarily to inserting the bolt head into the wall opening;

Figure 3 is a perspective view of the tamping device;

Figure 4 is a sectional view taken upon the line 4—4 of Figure 1.

Referring now more particularly to the drawing wherein like numerals of reference indicate corresponding parts throughout the several views, the numeral 1 indicates a wall in which is formed an opening or bore 2 into which a bolt such as is indicated by the numeral 3, is to be mounted with the threaded end projecting outwardly therefrom. The wall shown may be of cement, stone, brick or wood. The process of securing the bolt in the passage therein is the same in all instances.

The tamping element embodying the invention is indicated by the numeral 4 and as shown this comprises a tube formed of any suitable material and having one end cut-out transversely as indicated at 5. As shown the cut-out portion extends inwardly from the end of the tube but is of a depth less than the diameter thereof.

In using the element 4 for securing the bolt 3 in the wall passage, the bolt is partially enveloped in a heavy suitable cement, as indicated at 6. This body of cement is smoothed and rounded with the hand until it is of a diameter which will permit of its being inserted into the passage 2 with the bolt.

The passage 2 is of a diameter to snugly receive the head 7 of the bolt and also to snugly receive the tamping member 4. From this it will be understood that different sized tamping members are provided in practice so that the properly sized one may be selected for a bolt having a head requiring a passage of a certain diameter to receive it.

After forming the plastic cementing material 6 about a portion of the bolt adjacent the head, the head end of the bolt is inserted into the passage or bore 2 with the cement, until the head reaches the end of the bore. The tamping tube 4 is then inserted into the passage with the shank portion of the bolt extending thereinto as illustrated in Figure 1 and is tapped upon its outer end while being at the same time rotated, so as to pack the cementing substance firmly in the bore about the shank of the bolt and about the head. By providing the cut-out portion 5 in the end of the tube the cementing material 6 is evenly distributed about the bolt as the tube is turned while being tapped.

After the cementing material has been thoroughly packed or tamped into place, the tube is removed and a ball of cementing material is worked up in the hand and then forced into the passage about the bolt and the tube is then replaced on the bolt and employed in the manner as previously described to tamp the second body of cement firmly into place.

From the foregoing it will be readily apparent that by using the device herein described and following the herein described method a bolt may be securely mounted in any suitable passage so that when the cement surrounding it hardens it will be firmly held against withdrawal.

Having thus described the invention, what is claimed is:—

1. A device for the purpose described comprising a tubular body having a cut away area extending inwardly from one end along a longitudinal line between the longitudinal center and the side of the tube through which the cut away portion opens.

2. A device for tamping cement about a bolt positioned in a wall passage comprising a tubular body having an interior diameter of a size to snugly receive the shank of the bolt and exteriorly of a diameter to snugly fit into the passage, and means for evenly distributing the cement, against which the tube is forced, about the shank of the bolt, which consists of a longitudinally extending cut-out formed in the end of the tube which contacts with the cement.

3. A device for tamping cement about a bolt positioned in a wall passage, comprising a tubular body of an interior diameter to snugly receive the shank of the bolt and exteriorly of a diameter to snugly fit into the wall passage, that end of the tubular body entering the passage and engaging the cement therein having surfaces extending transversely of the body and disposed in offset relation, whereby the even distribution of the cement about the bolt shank may be effected as the body is driven inwardly to tamp the cement into position.

WILLIAM R. NUSBAUM.